US012771894B2

(12) United States Patent
Kim et al.

(10) Patent No.: US 12,771,894 B2
(45) Date of Patent: Oct. 20, 2026

(54) WIRELESS DISPLAY DEVICE, WIRELESS SET-TOP BOX, AND WIRELESS DISPLAY SYSTEM

(71) Applicant: LG ELECTRONICS INC., Seoul (KR)

(72) Inventors: Dongsung Kim, Seoul (KR); Gipum Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 145 days.

(21) Appl. No.: 18/293,545

(22) PCT Filed: Jul. 30, 2021

(86) PCT No.: PCT/KR2021/009942

§ 371 (c)(1),
(2) Date: Jan. 30, 2024

(87) PCT Pub. No.: WO2023/008621

PCT Pub. Date: Feb. 2, 2023

(65) Prior Publication Data

US 2024/0348855 A1 Oct. 17, 2024

(51) Int. Cl.
*H04N 21/422* (2011.01)
*G06F 3/16* (2006.01)
*H04R 3/02* (2006.01)

(52) U.S. Cl.
CPC ....... *H04N 21/42203* (2013.01); *G06F 3/167* (2013.01); *H04R 3/02* (2013.01)

(58) Field of Classification Search
None
See application file for complete search history.

(56) References Cited

U.S. PATENT DOCUMENTS

| | | | | |
|---|---|---|---|---|
| 9,508,357 | B1 * | 11/2016 | Krishnaswamy ....... | G10L 21/02 |
| 2006/0106604 | A1 * | 5/2006 | Okimoto ................. | G10L 15/06 704/243 |
| 2010/0333163 | A1 * | 12/2010 | Daly ................ | H04N 21/42204 704/275 |

(Continued)

FOREIGN PATENT DOCUMENTS

| | | |
|---|---|---|
| KR | 10-1999-001807 | 1/1999 |
| KR | 10-2010-0121953 | 11/2010 |

(Continued)

OTHER PUBLICATIONS

PCT International Application No. PCT/KR2021/009942, International Search Report dated Apr. 29, 2022, 4 pages.

*Primary Examiner* — Jonathan C Kim
(74) *Attorney, Agent, or Firm* — LEE, HONG, DEGERMAN, KANG & WAIMEY

(57) ABSTRACT

Disclosed is a wireless display system comprising a wireless set-top box for communicating with a wireless display device and performing voice recognition, the wireless set-top box comprising: a communication unit that transmits image data and sound data to the wireless display device; a microphone that receives a voice command of a user; and a control unit that, when the voice command of the user is received, obtains an echo removal parameter on the basis of location information of the wireless set-top box and performs echo removal by using the echo removal parameter.

13 Claims, 8 Drawing Sheets

(56) References Cited

U.S. PATENT DOCUMENTS

| | | | | |
|---|---|---|---|---|
| 2014/0003611 | A1* | 1/2014 | Mohammad | H04B 3/20 381/66 |
| 2014/0324421 | A1 | 10/2014 | Kim et al. | |
| 2014/0350925 | A1* | 11/2014 | Park | G10L 15/22 704/231 |
| 2016/0309119 | A1* | 10/2016 | Lasser | H04N 7/147 |
| 2018/0005642 | A1* | 1/2018 | Wang | G10L 21/0208 |
| 2018/0332340 | A1* | 11/2018 | Ogle | H04N 21/4131 |
| 2020/0051580 | A1* | 2/2020 | Seo | G10L 15/20 |
| 2020/0091959 | A1* | 3/2020 | Curtis | H04B 1/7073 |
| 2020/0228896 | A1* | 7/2020 | Chesney | G10L 15/22 |
| 2020/0243103 | A1* | 7/2020 | Gilson | G10L 15/22 |
| 2021/0327449 | A1* | 10/2021 | Shin | G10L 25/18 |
| 2022/0284893 | A1* | 9/2022 | Bani Hani | G10L 15/30 |
| 2023/0370671 | A1* | 11/2023 | Kim | G10L 21/0216 |
| 2023/0412997 | A1* | 12/2023 | Bouvigne | G01H 3/08 |
| 2024/0348855 | A1* | 10/2024 | Kim | G06F 3/16 |

FOREIGN PATENT DOCUMENTS

| | | |
|---|---|---|
| KR | 10-2012-0139289 | 12/2012 |
| KR | 10-2014-0127508 | 11/2014 |
| KR | 10-2021-0029002 | 3/2021 |

* cited by examiner (a) (b) (c)

WIRELESS DISPLAY DEVICE, WIRELESS SET-TOP BOX, AND WIRELESS DISPLAY SYSTEM

CROSS-REFERENCE TO RELATED APPLICATION(S)

This application is the National Stage filing under 35 U.S.C. 371 of International Application No. PCT/KR2021/009942, filed on Jul. 30, 2021, the contents of which is hereby incorporated by reference herein in its entirety.

TECHNICAL FIELD

This disclosure relates to a wireless set-top box, a wireless display device, a wireless display system, and a method for controlling the same.

BACKGROUND ART

A display device is a device that has a function of receiving, processing, and displaying images, which are capable of being viewed by a user. For example, a display device receives a broadcast signal selected by a user among broadcast signals transmitted from a broadcasting station, separates a video signal from the received signal, and displays the separated video signal on a display.

Recently, in addition to wired display devices, wireless display devices that are provided wirelessly are also being provided.

The wireless display device is provided as a wireless display system, and a wireless display device that communicates with a wireless set-top box is connected.

Therefore, when the user turns on power of the wireless display device, the power is supplied to an image processing unit and a display unit of the wireless display device, and also, power-on data is transmitted to a wireless set-top box. When the power-on data is received, the wireless set-top box supplies operating power to a tuner unit, an RF signal is tuned by the tuner unit to obtain a digital video signal, and the digital video signal outputs an image in a manner of being transmitted to the wireless display device.

When voice recognition is input from the display device, a microphone is provided in the wireless set-top box, and thus, there is a problem of having to change an algorithm for echo cancellation and recognition rate improvement, which are provided in the existing wired display devices.

Specifically, a wireless TV does not receive feedback from the sound signal provided by the speaker due to separation between the set-top box and the wireless display device, and as the set-top box and the wireless display device are disposed to be spaced apart from each other, delay occurs in signal transmission, and problems in which the echo cancellation and the voice recognition performance are deteriorated occur.

DISCLOSURE OF THE INVENTION

Technical Problem

The present disclosure is for solving the above problem and provide an echo cancellation and voice recognition improvement algorithm that takes into account a position of a set-top box in a wireless display device.

Technical Solution

A wireless set-top box that communicates with a wireless display device and performs voice recognition according to an embodiment of the present disclosure includes: a communication unit configured to transmit image data and sound data to the wireless display device; a microphone configured to receive a voice command of a user; and a control unit configured to acquire an echo cancellation parameter based on location information of the wireless set-top box and perform echo cancellation using the echo cancellation parameter.

In addition, the control unit may be configured to perform the echo cancellation for the voice command using the echo cancellation parameter an perform the voice recognition using voice data purified through the echo cancellation.

In addition, the control unit may be configured to acquire the echo cancellation parameter based on delay information that varies based the location information of the wireless set-top box.

In addition, the control unit may be configured to acquire the echo cancellation parameter based on location information of the wireless set-top box and direction information of the wireless set-top box.

In addition, microphone direction information of the wireless set-top box may refer to information about a direction in which the microphone provided in the wireless set-top box is directed.

In addition, the echo cancellation parameter may include a total harmonic distortion based on the location information of the wireless set-top box and a delay time based on the location information of the wireless set-top box.

In addition, the control unit may be configured to: acquire an output signal of the sound data transmitted to the wireless display device; perform the echo cancellation using the output signal and the echo cancellation parameter; and perform the voice recognition based on voice data purified through the echo cancellation.

In addition, the control unit may be configured to transmit a control signal corresponding to the voice recognition result to the wireless display device.

In addition, an operating method of a wireless set-top box includes: receiving a user voice command through the wireless set-top box; acquiring an echo cancellation parameter based on location information of the wireless set-top box and performing echo cancellation using the echo cancellation parameter through the wireless set-top box when the user voice command is received; performing the echo cancellation on the voice command using the echo cancellation parameter and performing the voice recognition using voice data, which is purified through the echo cancellation, through the wireless set-top box; transmitting a control signal corresponding to the voice recognition result to the wireless display device through the wireless set-top box; and performing a function corresponding to the control signal corresponding to the voice recognition result through the wireless set-top box.

In addition, the acquiring of the echo cancellation parameter based on the location information of the wireless set-top box may include acquiring the echo cancellation parameter based on delay information that varies based on the location information of the wireless set-top box.

In addition, the acquiring of the echo cancellation parameter may include acquiring the echo cancellation parameter based on the location information of the wireless set-top box and direction information of the wireless set-top box.

In addition, microphone direction information of the wireless set-top box may refer to information about a direction in which the microphone provided in the wireless set-top box is directed.

In addition, the echo cancellation parameter may include a total harmonic distortion based on the location information of the wireless set-top box and a delay time based on the location information of the wireless set-top box.

In addition, the performing of the echo cancellation may include: acquiring an output signal of sound data transmitted to the wireless display device; and performing the echo cancellation using the output signal and the echo cancellation parameter.

In addition, in a wireless display system including a wireless display device and a wireless set-top box, the wireless display system is configured to perform: a process of receiving a user voice command through the wireless set-top box; a process of acquiring an echo cancellation parameter based on location information of the wireless set-top box and performing echo cancellation using the echo cancellation parameter through the wireless set-top box when the user voice command is received; a process of performing the echo cancellation on the voice command using the echo cancellation parameter and performing the voice recognition using voice data, which is purified through the echo cancellation, through the wireless set-top box; a process of transmitting a control signal corresponding to the voice recognition result to the wireless display device through the wireless set-top box; and a process of performing a function corresponding to the control signal corresponding to the voice recognition result through the wireless set-top box.

Advantageous Effects

According to the embodiment of the present disclosure, the echo cancellation and the voice recognition rate during the voice recognition may be improved by considering the delay according to the position of the wireless set-top box.

MODE FOR CARRYING OUT THE INVENTION

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

Figure 1:
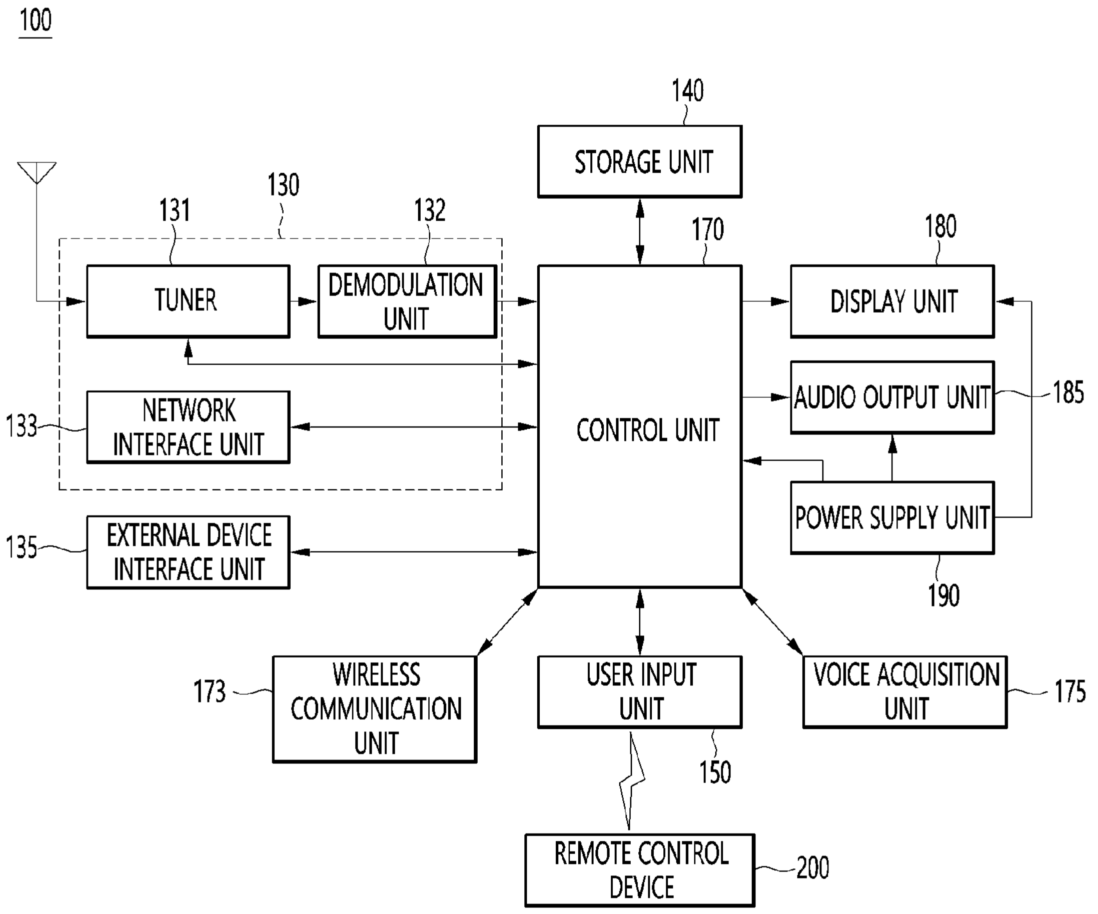
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception module 130, an external device interface unit 135, a storage unit 140, a user input unit 150, a control unit 170, a wireless communication interface unit 173, a display unit 180, an audio output unit 185, and a power supply unit 190.

The broadcast reception module 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program-related data signals, and may restore the divided video signals, audio signals, and data signals into an output available form.

The network interface 133 may provide an interface for connecting the display device 100 to a wired/wireless network comprising internet network. The network interface 133 may transmit or receive data to or from another user or another electronic device through an accessed network or another network linked to the accessed network.

The network interface unit 133 may access a predetermined webpage through an accessed network or another network linked to the accessed network. That is, the network interface unit 133 may transmit or receive data to or from a corresponding server by accessing a predetermined webpage through the network.

The network interface unit 133 may receive content or data provided from a content provider or a network operator. That is, the network interface unit 133 may receive content, such as movies, advertisements, games, VODs, and broadcast signals, which are provided from the content provider or the network operator, and information relating thereto through the network.

In addition, the network interface unit 133 may receive firmware update information and update files provided from the network operator, and may transmit data to the Internet or content provider or the network operator.

The network interface 133 may select and receive a desired application among applications open to the air, through network.

The external device interface unit 135 may receive an application or an application list in an adjacent external device and deliver the application or the application list to the control unit 170 or the storage unit 140.

The external device interface unit 135 may provide a connection path between the display device 100 and an external device. The external device interface unit 135 may receive at least one of an image or audio outputted from an external device that is wirelessly or wiredly connected to the display device 100 and deliver the received image or the audio to the controller. The external device interface unit 135 may include a plurality of external input terminals. The plurality of external input terminals may include an RGB terminal, at least one High Definition Multimedia Interface (HDMI) terminal, and a component terminal.

An image signal of an external device inputted through the external device interface unit 135 may be outputted through the display unit 180. A sound signal of an external device inputted through the external device interface unit 135 may be outputted through the audio output unit 185.

An external device connectable to the external device interface unit 135 may be one of a set-top box, a Blu-ray player, a DVD player, a game console, a sound bar, a smartphone, a PC, a USB Memory, and a home theater system but this is just exemplary.

Additionally, some content data stored in the display device 100 may be transmitted to a user or an electronic device, which is selected from other users or other electronic devices pre-registered in the display device 100.

The storage unit 140 may store signal-processed image, voice, or data signals stored by a program in order for each signal processing and control in the control unit 170.

In addition, the storage unit 140 may perform a function for temporarily storing image, voice, or data signals output from the external device interface unit 135 or the network interface unit 133, and may store information on a predetermined image through a channel memory function.

The storage unit 140 may store an application or an application list input from the external device interface unit 135 or the network interface unit 133.

The display device 100 may play content files (e.g., video files, still image files, music files, document files, application files, etc.) stored in the storage unit 140, and may provide the content files to a user.

The user input unit 150 may transmit signals input by a user to the control unit 170, or may transmit signals from the control unit 170 to a user. For example, the user input unit 150 may receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR communication methods.

In addition, the user input unit 150 may transmit, to the control unit 170, control signals input from local keys (not shown) such as a power key, a channel key, a volume key, and a setting key.

Image signals that are image-processed by the control unit 170 may be input to the display unit 180 and displayed as images corresponding to the image signals. In addition, image signals that are image-processed by the control unit 170 may be input to an external output device through the external device interface unit 135.

Voice signals processed by the control unit 170 may be output to the audio output unit 185. In addition, voice signals processed by the control unit 170 may be input to the external output device through the external device interface unit 135.

Additionally, the control unit 170 may control overall operations of the display device 100.

In addition, the control unit 170 may control the display device 100 by a user command or an internal program input through the user input unit 150, and may access the network to download a desired application or application list into the display device 100.

The control unit 170 may output channel information selected by a user together with the processed image or voice signals through the display unit 180 or the audio output unit 185.

In addition, the control unit 170 may output image signals or voice signals of an external device such as a camera or a camcorder, which are input through the external device interface unit 135, through the display unit 180 or the audio output unit 185, according to an external device image playback command received through the user input unit 150.

Moreover, the control unit 170 may control the display unit 180 to display images, and may control the display unit 180 to display broadcast images input through the tuner 131, external input images input through the external device interface unit 135, images input through the network interface unit, or images stored in the storage unit 140. In this case, an image displayed on the display unit 180 may be a still image or video and also may be a 2D image or a 3D image.

Additionally, the control unit 170 may play content stored in the display device 100, received broadcast content, and external input content input from the outside, and the content may be in various formats such as broadcast images, external input images, audio files, still images, accessed web screens, and document files.

Moreover, the wireless communication unit 173 may perform wired or wireless communication with an external device. The wireless communication unit 173 may perform short-range communication with an external device. For this, the wireless communication unit 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a wearable device capable of communication around the display device 100. Furthermore, if the detected wearable device is a device authenticated to communicate with the display device 100, the control unit 170 may transmit at least part of data processed in the display device 100 to the wearable device through the wireless communication unit 173. Therefore, a user of the wearable device may use the data processed by the display device 100 through the wearable device.

The voice acquisition unit 175 may acquire audio. The voice acquisition unit 175 may include at least one microphone (not shown) and may acquire audio around the display device 100 through the microphone (not shown).

The display unit 180 may convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 1, an image processing device such as the separated set-top box, and a content playback device including the display unit 180 and the audio output unit 185.

The audio output unit 185 receives the audio-processed signal from the control unit 170 to output an audio signal.

The power supply unit 190 supplies the corresponding power to the entire display device 100. Particularly, power may be supplied to the control unit 170 that is capable of being implemented in the form of a system on chip (SOC), the display unit 180 for displaying an image, the audio output unit 185 for outputting audio, and the like.

Specifically, the power supply unit 190 may include a converter that converts AC power to DC power and a DC/DC converter that converts a level of the DC power.

A remote control device according to an embodiment of the present disclosure will be described with reference to FIGS. 2 and 3.

Figure 2:
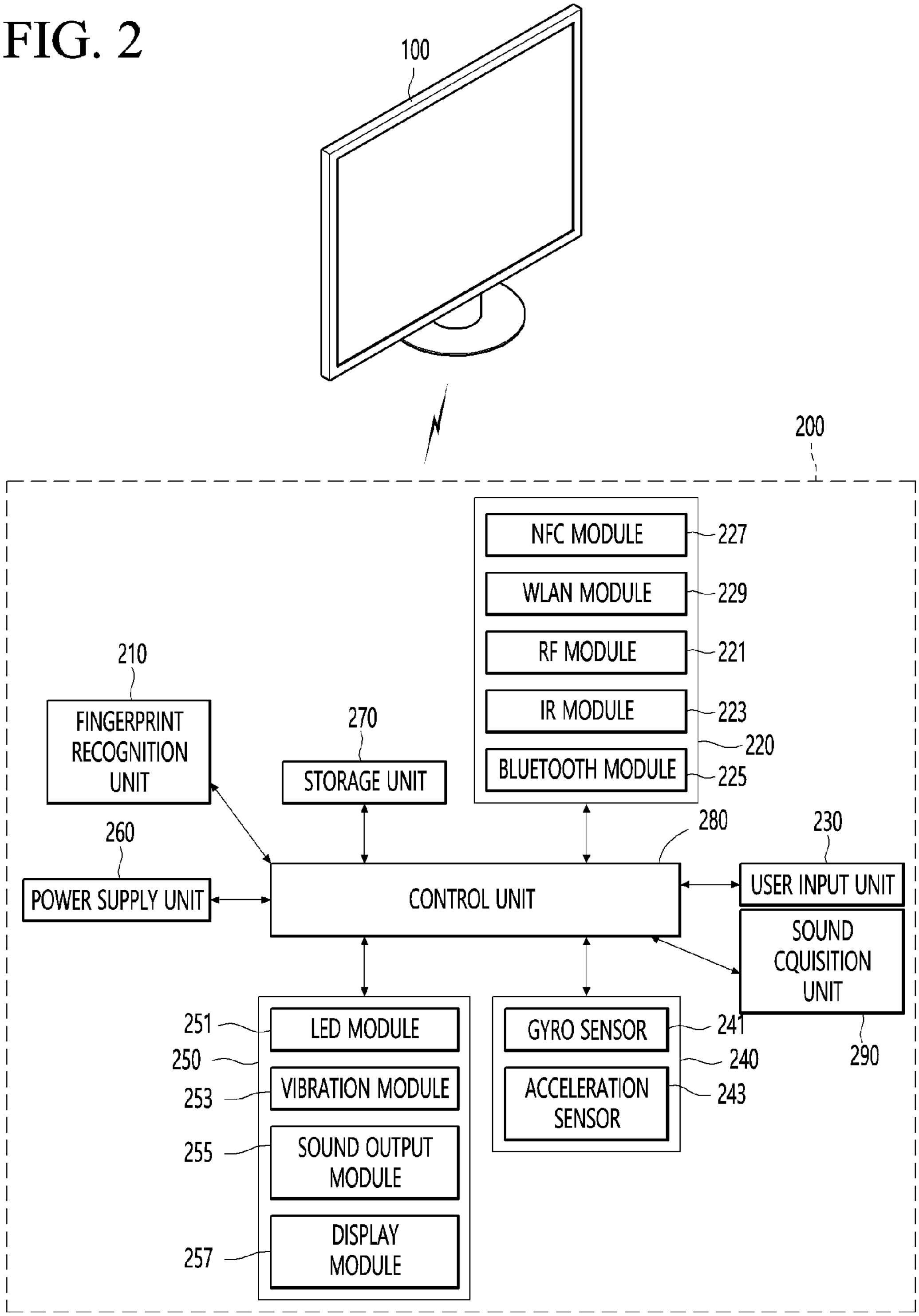
FIG. 2 is a block diagram illustrating a remote control device according to an embodiment of the present disclosure.
Figure 3:
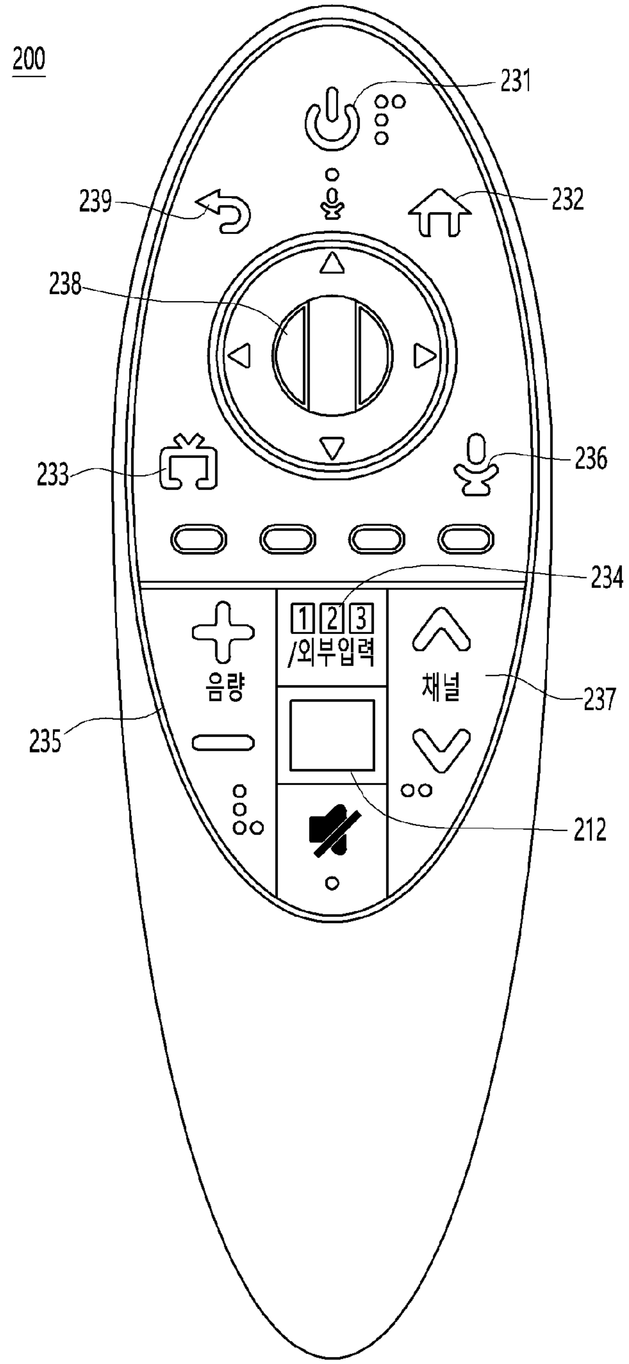
FIG. 3 is a view illustrating an actual configuration of the remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 may include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 may include a Bluetooth module 225 capable of transmitting or receiving signals to or from the display device 100 according to a Bluetooth communication standard. In addition, the remote control device 200 may include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 may transmit signals containing information on the movement of the remote control device 200 to the display device 100 through the wireless communication unit 220.

Moreover, the remote control device 200 may receive signals transmitted from the display device 100 through the RF module 221 and if necessary, may transmit a command for power on/off, channel change, and volume change to the display device 100 through the IR module 223.

The user input unit 230 may be configured with a keypad, a button, a touch pad, or a touch screen. A user may operate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for controlling a volume output from the display device 100. The voice recognition button 236 may be a button for receiving user's voice and recognizing the received voice. The channel change button 237 may be a button for receiving broadcast signals of a specific broadcast channel. The OK button 238 may be a button for selecting a specific function, and the back button 239 may be a button for returning to a previous screen.

FIG. 2 is described again.

If the user input unit 230 includes a touch screen, a user may touch a soft key of the touch screen to input a command relating to the display device 100 to the remote control device 200. In addition, the user input unit 230 may include various kinds of input interfaces operable by a user, for example, a scroll key and a jog key, and this embodiment does not limit the scope of the present disclosure.

The sensor unit 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display unit 180 of the display device 100.

The output unit 250 may output image or voice signals in response to the operation of the user input unit 230, or may output image or voice signals corresponding to signals transmitted from the display device 100. A user may recognize whether the user input unit 230 is operated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste may be reduced. The power supply unit 260 may resume the supply of power if a predetermined key provided at the remote control device 200 is operated.

The storage unit 270 may store various kinds of programs and application data required to control or operate the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 may store, in the storage unit 270, information on a frequency band for transmitting/receiving signals to/from the display device 100 paired with the remote control device 200 and refer to it.

The control unit 280 controls general matters relating to the control of the remote control device 200. The control unit 280 may transmit a signal corresponding to a predetermined key operation of the user input unit 230 or a signal corresponding to the movement of the remote control device 200 sensed by the sensor unit 240 to the display device 100 through the wireless communication unit 220.

In addition, the sound acquisition unit 290 of the remote control device 200 may acquire voice.

The sound acquisition unit 290 may include at least one microphone and acquire voice through the microphone.

Figure 4:
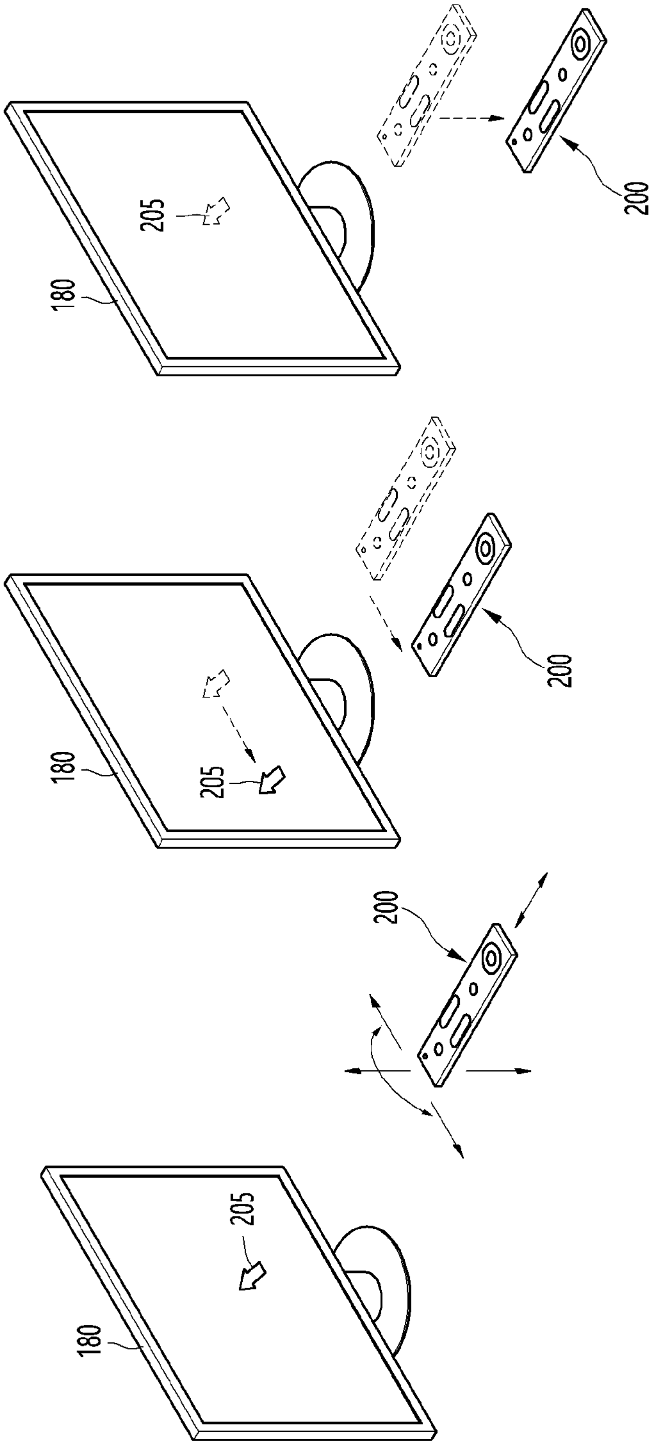
FIG. 4 is a view of utilizing a remote control device according to an embodiment of the present disclosure.

Next, FIG. 4 is described.

FIG. 4 is a view illustrating an example of utilizing a remote control device according to an embodiment of the present disclosure.

FIG. 4(*a*) illustrates that a pointer 205 corresponding to the remote control device 200 is displayed on the display unit 180.

A user may move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4 (*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4 (*c*) illustrates that while a specific button in the remote control device 200 is pressed, a user moves the remote control device 200 away from the display unit 180. Thus, a selected region in the display unit 180 corresponding to the pointer 205 may be zoomed in and displayed in an enlarged size.

On the other hand, if a user moves the remote control device 200 close to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement cannot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display unit 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

Figure 5:
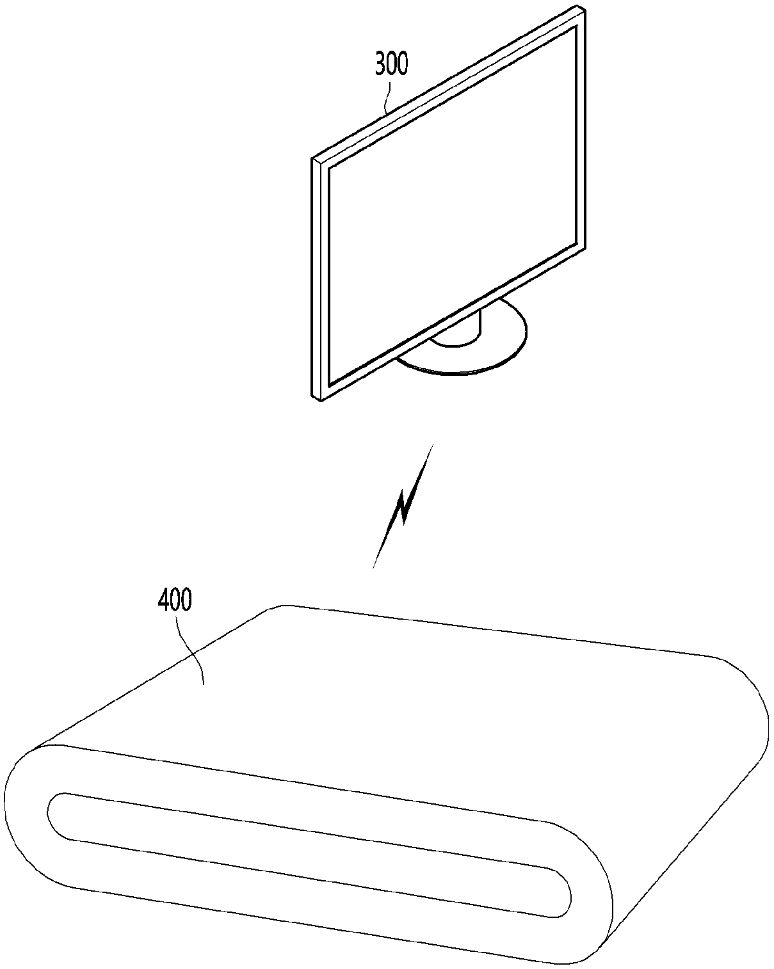
FIG. 5 is a view of a wireless display system according to an embodiment of the present disclosure.

FIG. 5 is a view illustrating a configuration of a wireless display system according to an embodiment of the present disclosure.

The configuration of the wireless display system will be described with reference to FIGS. 1 and 5 according to an embodiment of the present disclosure.

A wireless display system 1 according to an embodiment of the present disclosure may be constituted by a wireless set-top box 400 and a wireless display device 300.

The wireless set-top box and the wireless display device according to an embodiment of the present disclosure may include at least some of the configurations of FIG. 1.

Hereinafter, for convenience, a configuration of the wireless set-top box 400 is indicated with '-1', and a configuration of the wireless display device 300 is indicated with '-2'.

In general, the wireless set-top box 400 receives image data using a broadcast receiver 130-1, a network interface unit 133-1, and an external device interface unit 135-1 and processes the data to transmit the processed data to the wireless display device 300 through a wireless communication unit 173-1.

According to an embodiment of the present disclosure, the wireless display device 300 includes a display 180-2 such as an LCD, an LED, or an OLED, a wireless communication unit 173-2 that communicates with the wireless set-top box 400, a storage unit 140-2, an audio output unit 185-2, and a power supply unit 190-2 and serves to receive image data received from the wireless set-top box 400 to provide the image data to the user.

Figure 6:
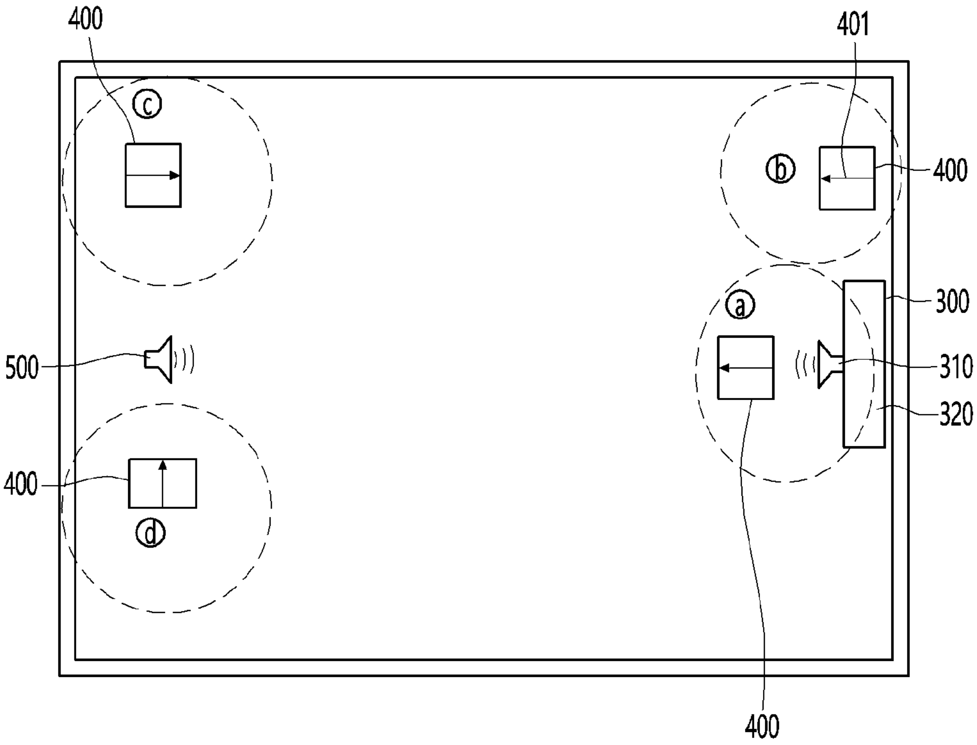
FIG. 6 is a view illustrating an example the wireless display system according to an embodiment of the present disclosure.

FIG. 6 is a view illustrating an example in use of a system according to an embodiment of the present disclosure.

Referring to FIG. 6, a wireless display system may be installed within a specific space.

The wireless display system may include at least one wireless display device 300 and a wireless set-top box 400.

The wireless set-top box 400 may be disposed at any position within the specific space to communicate with the wireless display device 300.

For example, referring to FIG. 6, the wireless set-top box 400 may be disposed at any one of areas a, b, c, and d indicated in the drawing.

In the case of the 'area a', a wireless set-top box in which a microphone 401 is disposed to face a user 500 is disposed in front of the wireless display device 300.

In the case of the 'area b', the wireless set-top box in which the microphone 401 is disposed to face the user 500 is disposed on a side surface of the wireless display device 300.

In the case of the 'area c', a wireless set-top box in which a microphone 401 is disposed to face the wireless display device 300 is disposed on a side surface of the user 500.

In the case of the 'area d', the wireless set-top box in which the microphone 401 is disposed to face the user is disposed on the side surface of the user.

The above embodiment is only an example and is not limited to the placement area of the wireless set-top box 400.

The wireless display device 300 may be disposed in a specific space by considering a main viewing area of the user 500.

The user 500 may view the wireless display device 300.

The user 500 may also be able to control the wireless display system by inputting a voice command to the wireless display system.

In a method for controlling the display device using voice, in the case of the conventional general wired display device, all components for performing voice recognition are included within one display device.

Specifically, when the display device receives a user's voice command, the display device may receive feedback of sound data output from the speaker to remove echo and voice noise and perform voice recognition using the obtained purified voice data.

In addition, in the process of receiving and processing the feedback from the speaker, a difference in echo cancellation and voice recognition rate may occur depending on delay, but since all operations are performed within a single display device, a voice recognition operation may be performed by reflecting a delay value corresponding to a corresponding product.

However, in the wireless display system of the present disclosure, the wireless set-top box 400 that performs image data and voice recognition and the wireless display device 300 that outputs image and sound data are disposed to be spaced apart from each other, and thus, it is not effective in voice recognition because additional delay occurs, or it is vulnerable to noise.

Figure 7:
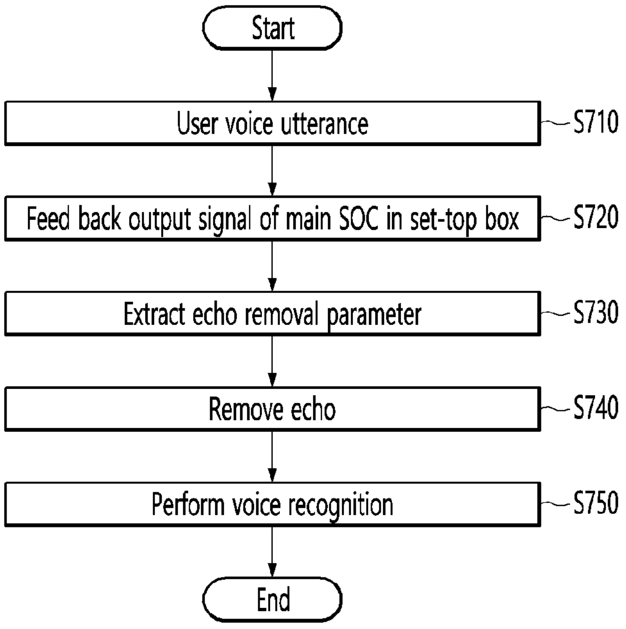
FIG. 7 is a flowchart according to an embodiment of the present disclosure.

FIG. 7 is a flowchart illustrating an operation of a wireless display system according to an embodiment of the present disclosure.

Referring to FIG. 7, a user may be watching image data and audio data output from a wireless display device 300 using a wireless display system.

According to an embodiment of the present disclosure, the user may utter a voice command (S710). Here, the voice command may be an utterance in which the user intends to control the wireless display system using voice.

For example, the voice command may include an activation word that allows the wireless display system to know that the voice command is being uttered from the user and command data for controlling the wireless display system.

The wireless set-top box 400 according to an embodiment of the present disclosure may transmit image data and audio data received through a broadcast receiver 130-1 or an external device interface unit 135-1 to the wireless display device 300.

In addition, the wireless set-top box 400 includes a voice acquisition unit 175-1 for voice input and amplification in order to receive voice recognition according to the user's utterance.

The control unit 170-1 of the wireless set-top box 400 may remove noise from the received voice signal and then perform voice recognition through echo cancellation.

Here, the echo cancellation may mean removing the voice signal output from the output unit 180-1 of the wireless display device 400 in order to improve a voice recognition rate.

According to an embodiment of the present disclosure, in order to effectively perform the echo cancellation and improve the voice recognition rate, when a user's voice command is received, the control unit 170-1 may acquire an echo cancellation parameter based on location information of the wireless set-top box and then perform the echo cancellation using the echo cancellation parameter.

Here, the echo cancellation may be a process of removing the audio data other than the voice data according to the user's utterance.

This will be described in detail below.

When the user's voice command is received, the wireless set-top box according to an embodiment of the present disclosure may feed back the output signal of a main system on chip (SoC) within the set-top box (S720).

Specifically, the wireless display device 300 may be provided as a separate device from the wireless set-top box 400 and may be installed separately, and thus, the wireless display device 300 may not receive the feedback from the speaker output from the wireless display device 300, but may directly acquire an amplifier output signal (e.g., 12 S signal) of the main SoC within the wireless set-top box 400.

Here, the I2S signal may be an audio communication-specific standard named 'Integrated Interchip Sound' and may be a voice signal exchange signal between the SoC and an amplifier in the wireless set-top box.

The control unit 170-1 of the wireless set-top box may acquire an output signal from the main SoC and determine the echo cancellation parameter using at least one of the output signal, the location information of the set-top box, or microphone placement direction information (S730).

Here, the location information of the set-top box may mean delay information that is changed based on the location information of the wireless set-top box.

Thereafter, the control unit may perform the echo cancellation for the voice command using the echo cancellation parameter and perform the voice recognition using the voice data purified through the echo cancellation.

This will be described as an example in FIG. 8.

Figure 8:
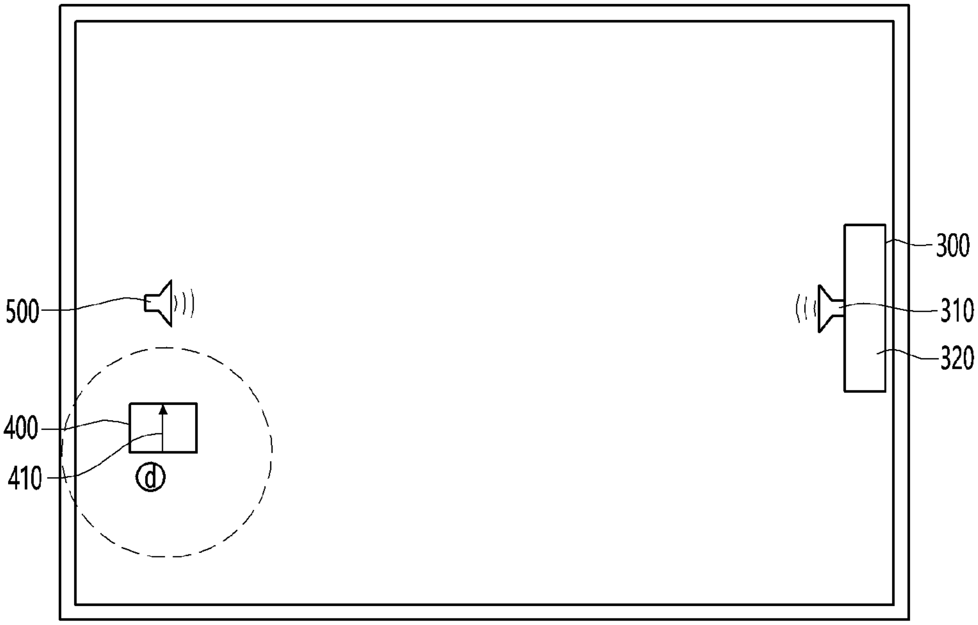
FIG. 8 is a view illustrating an example a wireless display system according to an embodiment of the present disclosure.

FIG. 8 is a view illustrating an example of a process of extracting the echo cancellation parameter according to an embodiment of the present disclosure.

Referring to FIG. 8, the wireless display system may be constituted by a wireless display device 300 and a wireless set-top box 400.

The wireless display device 300 may be disposed in front of a user, and the wireless set-top box 400 may be disposed on 'area a', which is a side surface of the user.

A speaker 310 and a display 320, which are included in the wireless display device 300, are in a state of being disposed to face the user, and a microphone 410 included in the wireless set-top box 400 is in a state of being disposed to face the user 500.

The user 500 may view image data and sound data output from the wireless display device 300.

The user 500 may control a wireless display system through a voice command.

The user may utter a specific voice command.

In order to improve a voice recognition rate, the wireless set-top box 400 according to an embodiment of the present disclosure may acquire an output signal of the main SoC and extract an echo cancellation parameter based on location information of the wireless set-top box.

Here, the echo cancellation parameter may include delay time information based on the location of the wireless set-top box.

That is, the echo cancellation parameter may include a total harmonic distortion based on the location information of the wireless set-top box and a delay time based on the location information of the wireless set-top box.

In addition, the delay time based on the location of the wireless set-top box may be determined based on the location information of the set-top box and the placement direction information of the microphone provided in the wireless set-top box.

Specifically, the location information of the set-top box may be set to a user's side surface, which is an 'area d'. In addition, placement direction information of the microphone 410 may be determined as a 'direction facing the user'.

In addition, a control unit 170-1 of the wireless set-top box may acquire signal transmission delay information based on the location of the set-top box.

The control unit 170-1 of the wireless set-top box may determine the echo cancellation parameter using the location information of the set-top box, the placement direction information of the microphone, and output signal information.

As a result, the echo cancellation and the voice recognition rate may be improved by considering the signal delay time that varies depending on the location of the wireless set-top box.

The control unit 170-1 of the wireless set-top box according to an embodiment of the present disclosure may model a formula for deriving the echo cancellation parameter based on the location of the set-top box and store the modeled formula in a memory.

Thereafter, the control unit 170-1 of the wireless set-top box may be disposed in a user's home to acquire the echo cancellation parameter installed by the echo cancellation parameter modeling formula stored in the current memory through initial setting.

FIG. 7 will be described again.

After performing the echo cancellation, the wireless display system according to an embodiment of the present disclosure may perform an operation corresponding to the user's voice command (S750).

Specifically, the control unit 170-1 of the wireless set-top box may analyze user's intention corresponding to the user's voice command and generate a control signal appropriate for the user's intention.

The control signal may be transmitted to components included in the wireless set-top box and may be transmitted to the wireless display device when related to output of image data or sound data.

The wireless display device may be able to perform an operation corresponding to the control signal received from the wireless set-top box.

Through the above method, in the existing display device, the sound data output through the speaker that is built into a TV or is connected to an external device may be acquired again through the microphone, and the obtained sound information may be amplified to extract the echo cancellation parameter.

According to an embodiment of the present disclosure, the wireless set-top box control unit 170-1 may correct a voice mode, a fan control method, and volume information of the image data, which are output from the wireless display device based on the location information of the wireless set-top box, together to improve the echo cancellation and the voice recognition rate.

Here, the voice mode may include equalizer information according to the video being viewed, the fan control method may include noise information according to an operation of the fan included in the wireless display system, and the volume information may include a volume size of the wireless display device, etc.

The above-disclosed subject matter is to be considered illustrative, and not restrictive, and the appended claims are intended to cover all such modifications, enhancements, and other embodiments, which fall within the true spirit and scope of the present invention.

Thus, the embodiment of the present invention is to be considered illustrative, and not restrictive, and the technical spirit of the present invention is not limited to the foregoing embodiment.

Therefore, the scope of the present invention is defined not by the detailed description of the invention but by the appended claims, and all differences within the scope will be construed as being comprised in the present invention.

What is claimed is:

1. A wireless set-top box that communicates with a wireless display device and performs voice recognition, the wireless set-top box comprising:

a transmitter configured to transmit image data and sound data to the wireless display device;

a microphone configured to receive a voice command of a user; and a controller configured to:

acquire an output signal of the sound data transmitted to the wireless display device, acquire an echo cancellation parameter based on the output signal, a position of the wireless set-top box placed on a side of the user located in front of the wireless display device and a direction of placement of the microphone toward the user, wherein the echo cancellation parameter comprises a total harmonic distortion based on location information of the wireless set-top box and a delay time based on the location information of the wireless set-top box, and perform echo cancellation using the output signal and the echo cancellation parameter.

2. The wireless set-top box according to claim 1, wherein the controller is configured to perform the echo cancellation for the voice command using the echo cancellation parameter and perform the voice recognition using voice data purified through the echo cancellation.

3. The wireless set-top box according to claim 2, wherein the controller is configured to transmit a control signal corresponding to a result of the voice recognition to the wireless display device.

4. The wireless set-top box according to claim 1, wherein the controller is configured to acquire the echo cancellation parameter based on delay information that varies based on location information of the wireless set-top box.

5. The wireless set-top box according to claim 1, wherein the echo cancellation parameter comprises a total harmonic distortion based on location information of the wireless set-top box and a delay time based on the location information of the wireless set-top box.

6. The wireless set-top box according to claim 1, wherein the controller is configured to:
- acquire an output signal of the sound data transmitted to the wireless display device;
- perform the echo cancellation using the output signal and the echo cancellation parameter; and
- perform the voice recognition based on voice data purified through the echo cancellation.

7. An operating method of a wireless set-top box comprising a microphone, the wireless set-top box configured to communicate with a wireless display device, the operating method comprising:
- receiving a voice command through the wireless set-top box;
- acquiring an output signal of sound data transmitted to the wireless display device;
- acquiring an echo cancellation parameter based on the output signal, a position of the wireless set-top box placed on a side of a user located in front of the wireless display device and a direction of placement of the microphone toward the user,
- wherein the echo cancellation parameter comprises a total harmonic distortion based on location information of the wireless set-top box and a delay time based on the location information of the wireless set-top box, and
- performing echo cancellation using the output signal and the echo cancellation parameter through the wireless set-top box when the voice command is received;
- performing the echo cancellation on the voice command using the echo cancellation parameter and performing voice recognition using voice data, which is purified through the echo cancellation, through the wireless set-top box;
- transmitting a control signal corresponding to a result of the voice recognition to the wireless display device through the wireless set-top box; and
- performing a function corresponding to the control signal corresponding to the result of the voice recognition through the wireless set-top box.

8. The operating method according to claim 7, wherein the acquiring of the echo cancellation parameter comprises acquiring the echo cancellation parameter based on delay information that varies based on location information of the wireless set-top box.

9. The operating method according to claim 7, wherein the echo cancellation parameter comprises a total harmonic distortion based on location information of the wireless set-top box and a delay time based on the location information of the wireless set-top box.

10. The operating method according to claim 7, wherein the performing of the echo cancellation comprises:
- acquiring an output signal of sound data transmitted to the wireless display device; and
- performing the echo cancellation using the output signal and the echo cancellation parameter.

11. A wireless display system comprising a wireless display device and a wireless set-top box comprising a microphone, wherein the wireless display system is configured to perform a process comprising:
- receiving a voice command through the wireless set-top box;
- acquiring an output signal of sound data transmitted to the wireless display device;
- acquiring an echo cancellation parameter based on the output signal, a position of the wireless set-top box placed on a side of a user located in front of the wireless display device and a direction of placement of the microphone toward the user,
- wherein the echo cancellation parameter comprises a total harmonic distortion based on location information of the wireless set-top box and a delay time based on the location information of the wireless set-top box,
- performing echo cancellation using the output signal and the echo cancellation parameter through the wireless set-top box when the voice command is received;
- performing the echo cancellation on the voice command using the echo cancellation parameter and performing voice recognition using voice data, which is purified through the echo cancellation, through the wireless set-top box;
- transmitting a control signal corresponding to a result of the voice recognition to the wireless display device through the wireless set-top box; and
- performing a function corresponding to the control signal corresponding to the result of the voice recognition through the wireless set-top box.

12. A wireless set-top box that communicates with a wireless display device and performs voice recognition, the wireless set-top box being physically separated from the wireless display device such that the wireless set-top box does not receive a speaker output of the wireless display device as feedback, the wireless set-top box comprising:
- a transmitter configured to transmit image data and sound data to the wireless display device;
- a microphone configured to receive a voice command of a user;
- a main system-on-chip (SoC) comprising an internal amplifier that outputs an audio signal as an inter-IC sound (I2S) signal; and
- a controller configured to:
- acquire the I2S signal from the internal amplifier of the main SoC as a reference signal for echo cancellation, in lieu of a feedback signal from a speaker of the wireless display device;
- determine an echo cancellation parameter based on the I2S signal, location information of the wireless set-top box indicating that the wireless set-top box is placed on a side of the user located in front of the wireless display device, and placement direction information of the microphone indicating a direction in which the microphone is directed, wherein the echo cancellation parameter comprises a total harmonic distortion value and a delay time value each derived based on the location information of the wireless set-top box; and
- perform echo cancellation on the voice command using the I2S signal and the echo cancellation parameter, and perform voice recognition using voice data purified through the echo cancellation.

13. The wireless set-top box according to claim 12, wherein the controller is further configured to:

store, in a memory of the wireless set-top box, a modeling formula for deriving the echo cancellation parameter based on the location information of the wireless set-top box and the placement direction information of the microphone; and upon initial installation of the wireless set-top box, acquire the echo cancellation parameter by applying current location information and current placement direction information of the microphone to the modeling formula stored in the memory, wherein the echo cancellation parameter acquired through the modeling formula is used for subsequent echo cancellation performed when the voice command is received.

* * * * *